United States Patent
Swamy et al.

[19]

[11] Patent Number: 6,035,350
[45] Date of Patent: Mar. 7, 2000

[54] DETACHABLE I/O DEVICE WITH BUILT-IN RF/IR FUNCTIONALITY TO FACILITATE REMOTE AUDIO-VISUAL PRESENTATION

[75] Inventors: N. Deepak Swamy, Austin; Robert L. McMahan, Cedar Park, both of Tex.

[73] Assignee: Dell USA, L.P., Round Rock, Tex.

[21] Appl. No.: 08/787,500

[22] Filed: Jan. 21, 1997

[51] Int. Cl.$^7$ ..................................................... G06F 3/033
[52] U.S. Cl. ................................................. 710/73; 710/51
[58] Field of Search .............................. 384/14; 455/31.2, 455/66; 345/167, 179, 163, 520, 160, 169; 341/176; 710/73, 51; 382/313

[56] References Cited

U.S. PATENT DOCUMENTS

| | | | |
|---|---|---|---|
| 5,049,863 | 9/1991 | Oka .......................................... | 345/163 |
| 5,184,314 | 2/1993 | Kelly et al. ............................... | 708/131 |
| 5,307,297 | 4/1994 | Iguchi et al. .............................. | 345/169 |
| 5,341,167 | 8/1994 | Guichard et al. .......................... | 348/14 |
| 5,428,663 | 6/1995 | Grimes et al. ........................... | 455/31.2 |
| 5,459,489 | 10/1995 | Redford .................................. | 345/179 |
| 5,495,358 | 2/1996 | Bartig et al. .............................. | 359/189 |
| 5,563,630 | 10/1996 | Tsakiris .................................... | 345/160 |
| 5,574,804 | 11/1996 | Olschafskie et al. ...................... | 382/313 |
| 5,726,684 | 3/1998 | Blankenship et al. .................... | 345/167 |
| 5,771,441 | 7/1998 | Altstatt ..................................... | 455/66 |
| 5,812,085 | 9/1998 | Barraza et al. ........................... | 341/176 |
| 5,812,115 | 9/1998 | Fan et al. ................................. | 345/163 |
| 5,880,745 | 3/1999 | Miichi ...................................... | 345/520 |

FOREIGN PATENT DOCUMENTS

| | | |
|---|---|---|
| 0 599 522 A1 | 6/1994 | European Pat. Off. . |
| 0 665 502 A1 | 8/1995 | European Pat. Off. . |
| 0 674 255 A1 | 9/1995 | European Pat. Off. . |
| 0 696 855 A2 | 2/1996 | European Pat. Off. . |
| 8-161241 | of 1996 | Japan .............................. G06F 13/00 |

OTHER PUBLICATIONS

Home Computer Advanced Cource—"Walky Talky (ACT Apricot Portable Microcomputer)", 1985, pp. 1009–11.

(List continued on next page.)

*Primary Examiner*—Albert De Cady
*Assistant Examiner*—David Ton
*Attorney, Agent, or Firm*—Skjerven, Morrill, MacPherson, Franklin & Friel, L.L.P.

[57] ABSTRACT

A trackpad or other input/output device is detachable from a computer and adapted with a remote communication functionality using radio frequency (RF) or infrared (IR) technologies, thereby facilitating the performance of slide presentations and other graphic displays. A remote presentation capability allows a computer user to conveniently address a group from a position at a suitable location, such as a podium, that is removed from the computer system. A remote interface includes a trackpad or other input/output device and activation buttons. The input/output device is housed in a small removable enclosure which is adapted for docking into an aperture in the computer. The input/output device is rechargeable with a charger installed into the computer so that the input/output device is recharged during docking with the computer. A portable computer includes a removable input/output (I/O) device that functions as a conventional computer interface when docked to the portable computer and functions as a remote control for controlling operations of the portable computer when the I/O device is removed from the portable computer. The removable I/O device includes one or more activation buttons for usage in controlling operations such as the display operations of an audio-visual presentation. When the I/O device is removed from the portable computer, the I/O device communicates with the portable computer using a remote communication technique such as radio frequency (RF) or infrared (IR) remote communication techniques. The removable I/O device include rechargeable batteries that power the I/O device while the device is used remotely. The rechargeable batteries are charged by the portable computer when the I/O device is returned to the portable computer and docked to the portable computer.

33 Claims, 5 Drawing Sheets

OTHER PUBLICATIONS

IEEE Int'l Conf. on Communications; Seattle, WA; Jun. 18–22, 1995, "Testbed for Mobile Networked Computing", pp. 410–416.

Forman, George H.; et al.—Computer v 27 n 4, Apr. 1994. 9p, "Challenges of Mobile Computing", pp. 38–47.

H. Swanson, Conf. Proc. RF Expo West San Diego, CA, USA Jan. 29–Feb. 1, 1995 "A Single Conversion FM Receiver for Wireless Data Communication on 902–928 Mhz ISM Band", 1995, pp. 1–10.

G. Phetteplace, Conf. Proc. RF Expo West San Jose, CA, USA, Mar. 22–24, 1994 "Design on Infrared Data Link Using an Integrated FSK Transceiver", 1994, pp. 332–335.

B. Horne, Computing Today—"The Apricot Portable", May 1985, pp. 32–3.

F. Newman, Micro Decision—"A Portable ACT Put on the Map (Portable Microcomputer)", Apr. 1985, pp. 112–116.

DETACHABLE I/O DEVICE WITH BUILT-IN RF/IR FUNCTIONALITY TO FACILITATE REMOTE AUDIO-VISUAL PRESENTATION

BACKGROUND OF THE INVENTION

1. Field of the Invention

The present invention relates to computer systems. More specifically, the present invention relates to a computer system such as a portable or notebook computer system that includes a remote input device.

2. Description of the Related Art

Many software programs, such as PowerPoint in the Microsoft Office suite and Micrographx SlideShow, have been developed to facilitate the production of screen presentations. For example, PowerPoint allows a user to create slides, overhead transparencies, or printed presentations, and to display these visual aids simply by interactions on a computer.

The user controls the sequence of visual aid performance using either the keyboard or an input/output device attached to the computer, such as a mouse, a trackball, a trackpad, or other input/output device. The input/output device is connected to the computer so that a lone person performing a presentation is constrained to a location nearby the computer. A presenter and audience commonly are distracted and inconvenienced by the presenters need to leave a suitable position before the audience to press a key on the computer keyboard to advance the slide or screen display.

What is needed is a technique for controlling a computer from a remote position. What is needed is a technique for controlling a computer from a remote position to facilitate computer-generated or computer-displayed presentations.

SUMMARY OF THE INVENTION

In accordance with an embodiment of the present invention, a trackpad or other input/output device is detachable from a computer and adapted with a remote communication functionality using a wireless technology such as a radio frequency (RF) or infrared (IR) technology, thereby facilitating the performance of slide presentations and other graphic displays. A remote presentation capability allows a computer user to conveniently address a group from a position at a suitable location, such as a podium, that is removed from the computer system.

In accordance with an embodiment of the present invention, a remote interface includes a trackpad or other input/output device and activation buttons. The input/output device is housed in a small removable enclosure which is adapted for docking into an aperture in the computer. The input/output device is rechargeable with a charger installed into the computer so that the input/output device is recharged during docking with the computer.

In accordance with an embodiment of the present invention, a portable computer includes a removable input/output (I/O) device that functions as a conventional computer interface when docked to the portable computer and functions as a remote control for controlling operations of the portable computer when the I/O device is removed from the portable computer. The removable I/O device includes one or more activation buttons for usage in controlling operations such as the display operations of an audio-visual presentation. When the I/O device is removed from the portable computer, the I/O device communicates with the portable computer using a remote communication technique such as radio frequency (RF) or infrared (IR) remote communication techniques. The removable I/O device include rechargeable batteries that power the I/O device while the device is used remotely. The rechargeable batteries are charged by the portable computer when the I/O device is returned to the portable computer and docked to the portable computer.

Many advantages are achieved by the described detachable input/output device with built-in remote communication capabilities and operating method. A person presenting an audio-visual production is highly benefited by a capability to control a computer from a remote position. The described remote communication system and operating method advantageously supplies a cost-effective, portable, multimedia presentation apparatus.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings. The use of the same reference symbols in different drawings indicates similar or identical items.

DESCRIPTION OF THE ILLUSTRATIVE EMBODIMENT(S)

Figure 1:
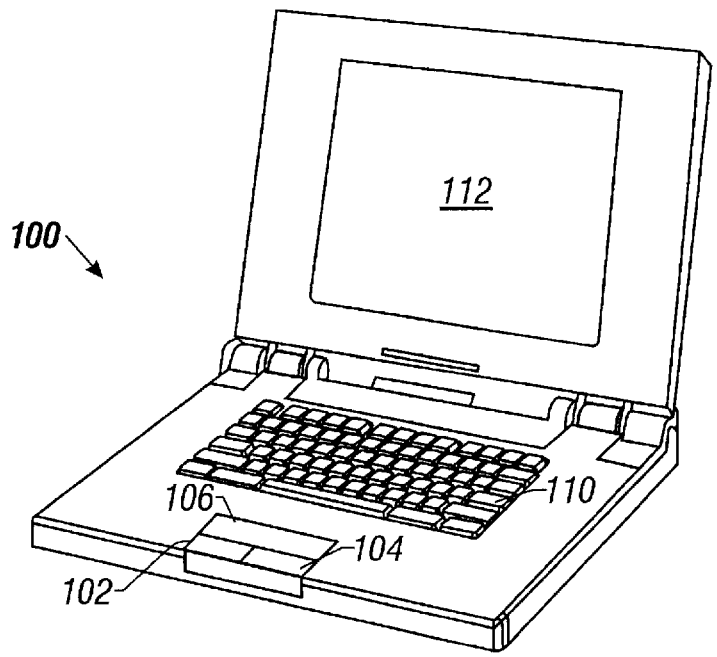
FIG. 1 is a pictorial frontal view showing a portable computer which includes a removable input/output device for entering data to the portable computer from a remote location.

Referring to FIG. 1, a pictorial frontal view shows a portable computer 100 which includes a removable input/output device 102 for entering data to the portable computer 100 from a remote location. The portable computer 100 includes standard input and output features such as a keyboard 110 and a display screen 112. In the illustrative embodiment, the removable input/output device 102 is a trackpad input/output device having a capacitive connector 106 for sensing movement in X and Y directions and buttons 104 for pressing or releasing. Information concerning the amount and direction of motion in the X and Y directions and regarding the actuation of a button is passed to the portable computer 100 via a communication link (not shown). In some embodiments, the removable input/output device 102 is integrated into a portable computer 100 such as a notebook or laptop computer as a standard feature.

Figure 2:
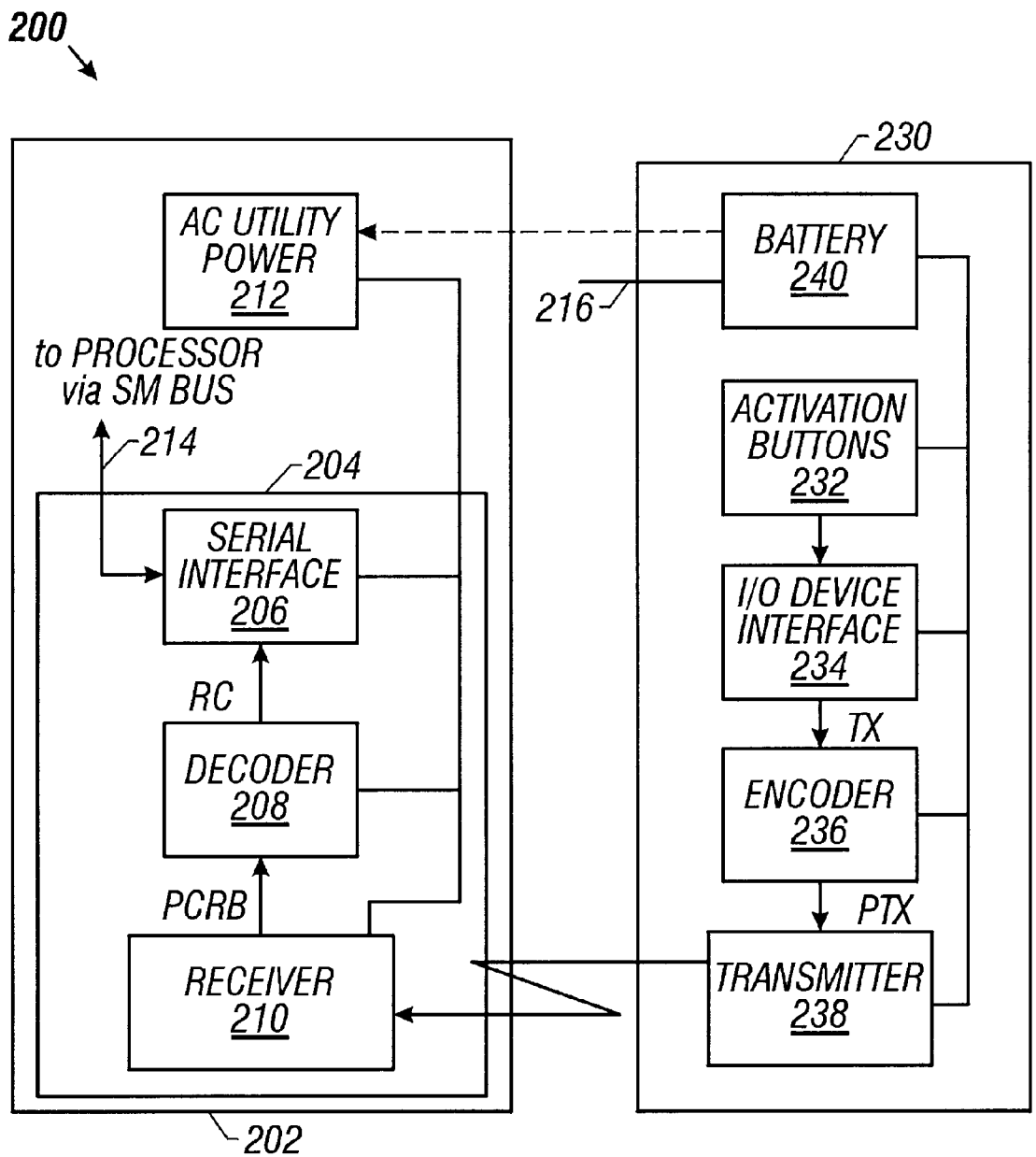
FIG. 2 is a schematic block diagram which illustrates an embodiment of a remote I/O device communication system.

Referring to FIG. 2, a schematic block diagram illustrates an embodiment of a remote I/O device communication system 200. A receiver subsystem 204 of the remote I/O device communication system 200 is connected as a peripheral device in a computer 202, such as a notebook computer, portable computer, laptop computer, handheld computer or the like, for performing remote communications with a detachable input/output device 230. The detachable input/output device 230 is a remote transmitter subsystem of the detachable input/output device 230 that operates in conjunction with the receiver subsystem 204 to supply remote communications from the detachable input/output device 230 to the computer 202.

The receiver subsystem 204 of the remote I/O device communication system 200 includes a serial interface 206, a decoder 208, and a receiver 210. The serial interface 206 is a conventional serial interface, such as a universal asynchronous receiver and transmitter (UART), a universal synchronous and asynchronous receiver and transmitter (USART), an asynchronous communications interface adapter (ACIA), a serial input/output (SIO), a multiple protocol communications controller, a serial communications controller, a data link controller, and the like. The serial interface 206 includes an internal programmable baud rate generator (not shown) for transmitting a serial bit stream at a programmable baud rate up to 115.2 Kbaud.

The detachable input/output device 230 of the remote I/O device communication system 200 includes a plurality of activation buttons 232, an I/O device interface 234, an encoder 236, a transmitter 238, and a rechargeable energy source such as a battery 240, such as a small rechargeable battery cell. The activation buttons 232 are actuated by a user to generate signals applied to the I/O device interface 234. The I/O device interface 234 converts the data to a serial bit stream format for transmission as a TX signal and passes the serial bit stream signal TX to the encoder 236. The encoder 236 converts the serial bit stream signal TX into an electrical pulse form PTX and passes the electrical pulse signal PTX to the transmitter 238. In various embodiments, the remote transmission signal may be an infrared (IR) signal or a radio frequency (RF) signal. The encoder 236 generates an electrical pulse signal PTX in which the time scale is compressed. In the example of an infrared (IR) signal, the transmitter 238 converts the electrical pulse signal PTX into optical infrared light pulses and transmits the infrared light pulses at a selected baud rate. The battery 240 is rechargeable and supplies operating power to the detachable input/output device 230 including the activation buttons 232, the I/O device interface 234, the encoder 236, and the transmitter 238. Typically, the configuration of the activation buttons 232 is selected to match the buttons and controls of standard I/O devices such as the button and mouse controls of mice, trackballs and track-pads.

The receiver subsystem 204 of the remote I/O device communication system 200 receives the communication signals generated by the detachable input/output device 230 at the receiver 210 and transforms the communication signals into received electrical pulses PRCB. In the example of an infrared remote I/O device communication system 200, the receiver 210 detects infrared light pulses generated by another source transmitter and converts the light signal to electrical pulses. The receiver 210 passes the received electrical pulses PRCB to the decoder 208 which decodes the electrical pulses into a serial bit stream RC. The decoder 208 directs the serial bit stream RC to a serial input location of the serial interface 206 for communication to the computer. The receiver subsystem 204 is powered by the AC utility power 212 which supplies operating power to the computer 202 including the serial interface 202, the decoder 208 and the receiver 210.

Figure 4:
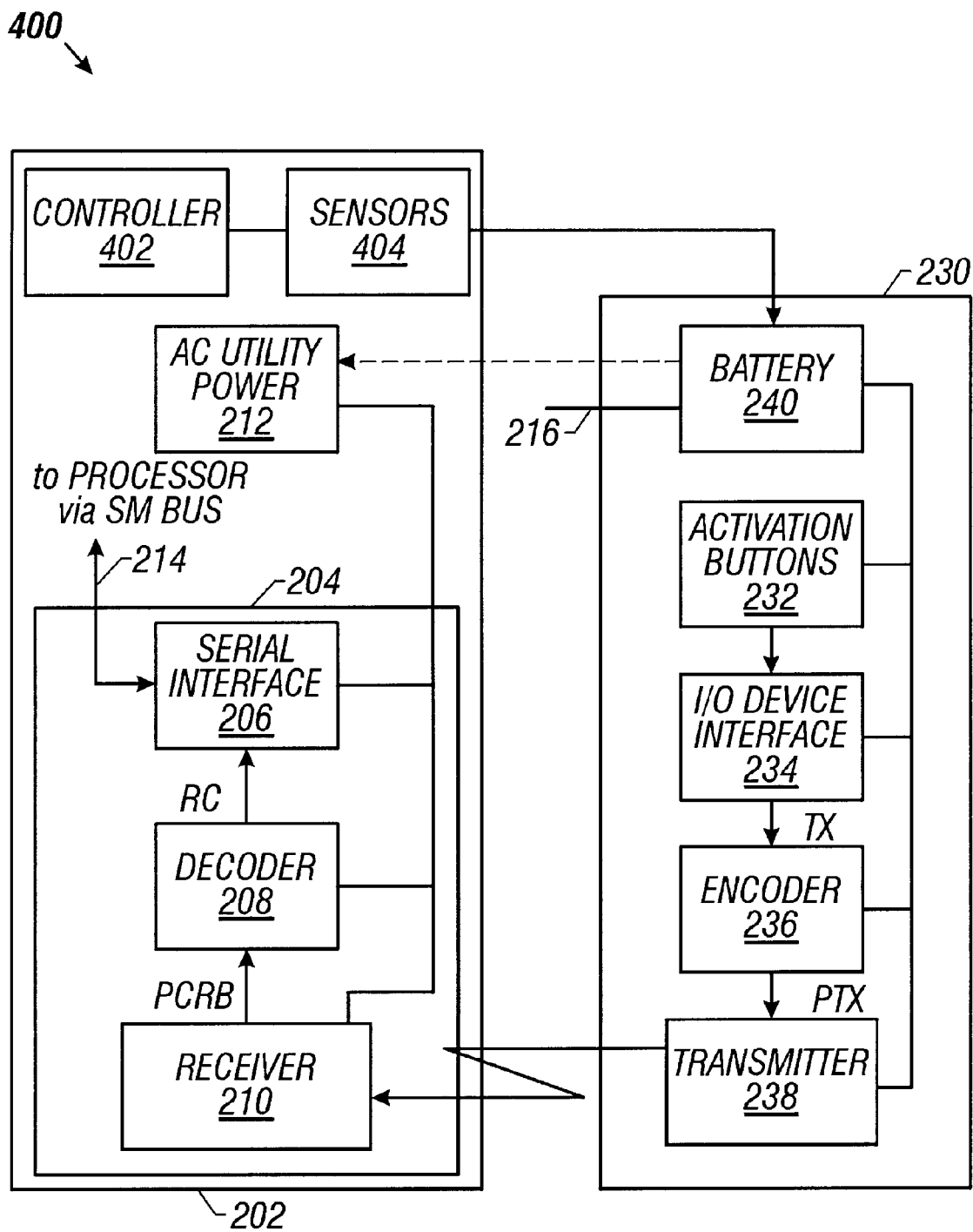
FIG. 4 is a schematic block diagram illustrating an embodiment of a remote I/O device communication system which includes a controller and sensors connected to a battery for controlling the charging of the battery.

In addition to supplying operating power to the receiver subsystem 204 of the computer 202, the AC utility power 212 also supplies power to the detachable input/output device 230 by charging the battery 240 when the detachable input/output device 230 is attached to the computer 202. The receiver subsystem 204 is connected to a smart management (SM) bus 214. The smart management bus 214 is a standard bus for supplying connections to multiple various input/output devices including keyboard, mouse, trackpad, trackball, joystick connections and the like. The smart management bus 214 advantageously detects the presence, number, type and location of installed input/output devices so that present devices are selectively powered while devices that are not present or are deactivated are not supplied with power. A "device present" pin 216 is included on the detachable input/output device 230 to detect when the detachable input/output device 230 is connected to or detached from the computer 202. When the device present pin 216 is indicative that the device is connected, the battery 240 is charged. In some embodiments, for example an embodiment shown in FIG. 4, a remote I/O device communication system 400 includes a controller 402 and sensors 404 for connection to the battery 240 when the detachable input/output device 230 is attached to the computer 202 for determining the charge on the battery 240 and recharging the battery 240 only when the battery charge is within preselected limits.

Figure 3:
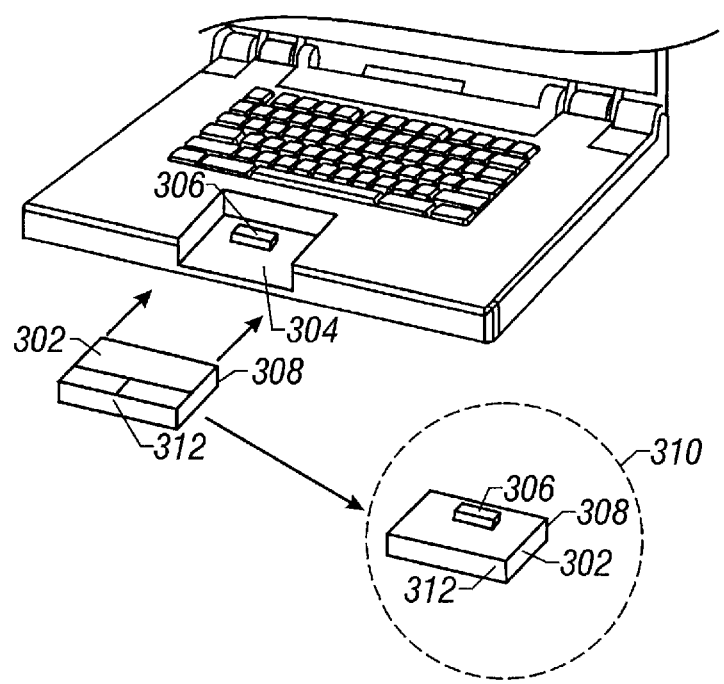
FIG. 3 is a pictorial view showing a modified track-pad or track-ball I/O device which interconnects to a main circuit board of a portable computer using a pair of board-to-board connectors.

In some embodiments, the detachable input/output device 230 is a modified version of standard track-pad or track-ball I/O devices. Referring to FIG. 3, a modified track-pad or track-ball I/O device 302 interconnects to a main circuit board 304 of a portable computer 300 using a pair of board-to-board connectors 306. The board-to-board connectors 306 are typically surface mount connectors, through-hole connectors or the like. Usage of board-to-board connectors 306 is advantageous in comparison to utilization of more conventional connectors such as a flex interconnect since board-to-board connectors 306 form a solid electromechanical connection while facilitating detachment, when desired. The modified track-pad or track-ball I/O device 302 has a leading edge 308 that forms a primary mechanical interlock 310. When a trailing edge 312 of the modified track-pad or track-ball I/O device 302 is seated, the board-to-board connectors 306 are simultaneously mated to furnish a solid electromechanical interconnect. An inverted view 310 of the modified track-pad or track-ball I/O device 302 illustrates the board-to-board connectors 306 connected to the modified track-pad or track-ball I/O device 302.

Figure 5:
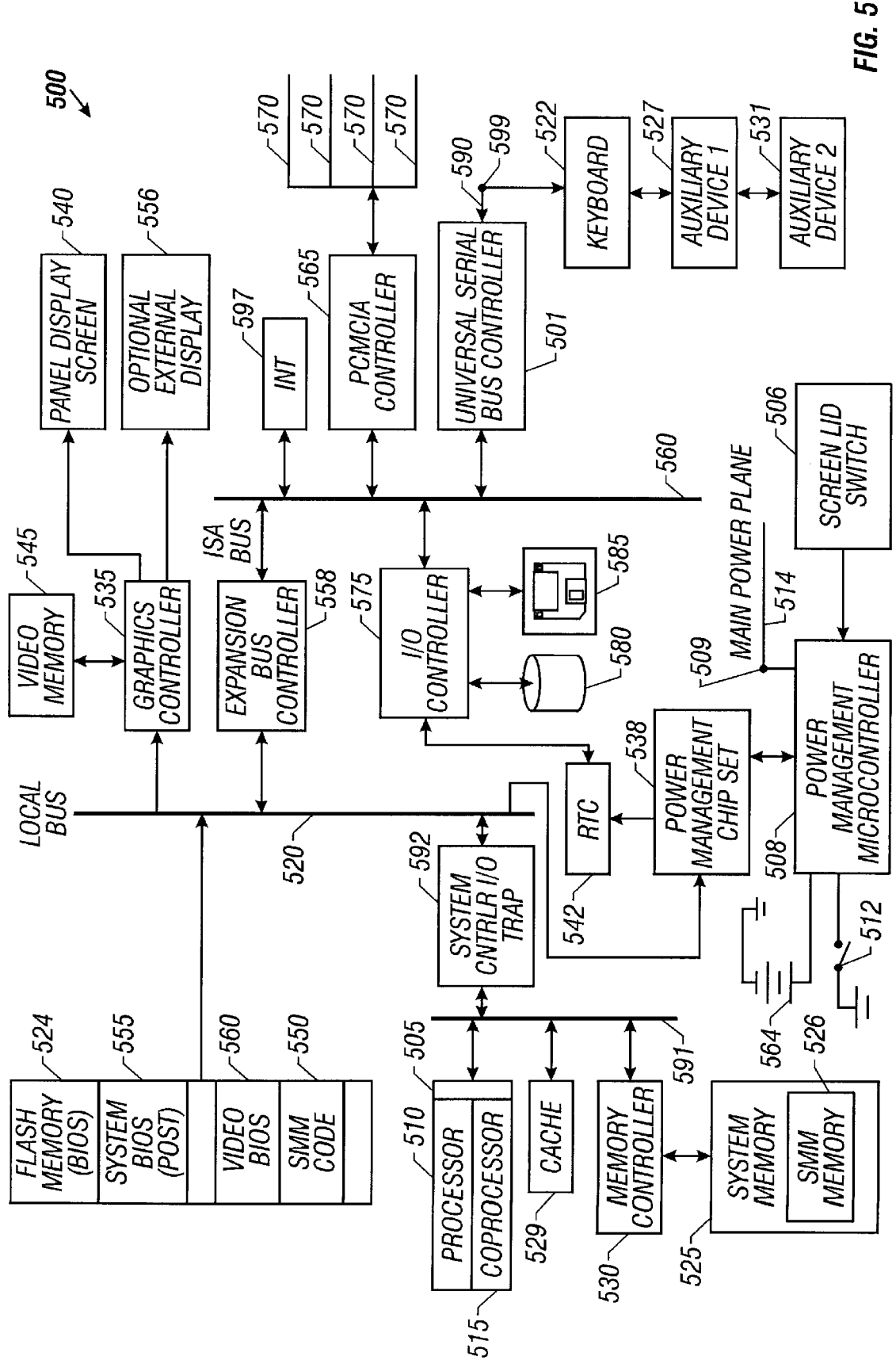
FIG. 5 is a block diagram showing a portable computer system which includes the remote I/O device communication system.

Referring to FIG. 5, a portable computer system 500 includes a microprocessor 505 which may also be called a CPU. In some embodiments, the microprocessor 505 is, for example, an Intel™ Pentium class microprocessor or Intel™ 80486 class microprocessor. The microprocessor 505 has a processor 510 for calculating integer operations and a coprocessor 515 for calculating floating point operations. Microprocessor 505 is connected to a cache 529 and a memory controller 530 via a CPU bus 591. The cache 529 may include both a primary cache (not shown) and a secondary cache (not shown).

A system controller I/O trap circuit 592 connects the CPU bus 591 to a local bus 520. The system controller I/O trap circuit 592 is generally characterized as part of a system controller such as a Pico Power Vesuvious or an Intel™ Mobile Triton chip set. In some embodiments, the system controller I/O trap circuit 592 is programmed to intercept a particular target address or address range. Upon intercepting a target address, the system controller I/O trap circuit 592 asserts an intercept signal indicating that the microprocessor 505 has attempted to access the target address.

In the some embodiments, the intercept signal is connected to an SMI ("system management interrupt") pin of the microprocessor 505, causing the microprocessor 505 to enter system management mode ("SMM").

A main memory 525, typically assembled from a plurality of dynamic random access memory ("DRAM") modules, is connected to the local bus 520 by a memory controller 530. The main memory 525 includes a system management mode memory area which is employed to store converter code to implement conversion methodology embodiments as will be discussed in more detail subsequently.

A Basic Input Output System ("BIOS") memory 524 is connected to local bus 520. A FLASH memory or other nonvolatile memory is used as BIOS memory 524. BIOS memory 524 stores the system code which controls some operations of the portable computer system 500.

A graphics controller 535 is connected to the local bus 520 and to a panel display screen 540. The graphics controller 535 is also connected to a video memory 545 which stores information to be displayed on panel display 540. The panel display 540 is typically an active matrix or passive matrix liquid crystal display ("LCD") although other display technologies may be used as well. Graphics controller 535 is optionally connected to an optional external display or standalone monitor display 556. One example of a suitable graphics controller for usage as the graphics controller 535 is the Western Digital WD90C24A graphics controller.

A bus interface controller or expansion bus controller 558 connects the local bus 520 to an expansion bus 560. In the illustrative embodiment, expansion bus 560 is an Industry Standard Architecture ("ISA") bus although other buses, for example, a Peripheral Component Interconnect ("PCI") bus, may otherwise be used. A PCMCIA "Personal Computer Memory Card International Association") controller 565 is connected to expansion bus 560. The PCMCIA controller 565 is connected to a plurality of expansion slots 570 to receive PCMCIA expansion cards such as modems, fax cards, communications cards, and other input/output devices. An interrupt request generator 597 is also connected to the ISA bus 560 and issues an interrupt service request over a predetermined interrupt request line after receiving a request signal from the processor 505 requesting issuance of an interrupt An I/O controller 575 is connected to ISA bus 560. The I/O controller 575 is interfaced to both an integrated drive electronics ("IDE") hard drive 580 and a floppy diskette drive 585.

A USB controller 501 transfers data to and from the processor 510 via the ISA bus 560. A keyboard 522, auxiliary device I, and auxiliary device II are connected serially to a USB connector 599. This interconnection topology is implemented according the USB technology standard. External devices which include keyboard 522, auxiliary device I, and auxiliary device II communicate with microprocessor 505 via the USB controller 501. Auxiliary devices are typically communication devices such as a mouse, a modem, a joystick, or another computer system. When USB controller 501 receives data from the connected external devices, USB controller 501 issues an interrupt request to the microprocessor 505. The microprocessor 505 interprets the interrupt request as a request for service from a conventional communication interface and attempts to process the interrupt request accordingly. However, a USB servicing routine is executed instead.

The portable computer system 500 includes a power supply 564, such as a battery, which supplies operating power to the many devices of the portable computer system 500. The power supply 564 in the portable computer system 500 is a rechargeable battery, such as a nickel metal hydride ("NiMH") or lithium ion battery. The power supply 564 is connected to a power management microcontroller 508 which operates in the manner of an AC line adapter and controls the distribution of power from power supply 564. More specifically, the power control microcontroller 508 includes a power output terminal 509 connected to a main power plane 514 which supplies power to microprocessor 505. The power management microcontroller 508 is also connected to a power plane (not shown) supplying operating power to panel display 540. In the illustrative embodiment, the power control microcontroller 508 is a Motorola 6805 microcontroller. The power control microcontroller 508 monitors the charge level of the power supply 564 to determine when to charge a battery 564 and when to deny a charging voltage to the battery 564. The power control microcontroller 508 is connected to a main power switch 512 which the user actuates to turn on or shut off the portable computer system 500. While the power control microcontroller 508 powers down other portions of the portable computer system 500 such as hard drive 580 when not in use to conserve power, the power control microcontroller 508 itself is always connected to a source of energy, namely power supply 564.

The portable computer system 500 also includes a screen lid switch 506 or indicator for indicating when the panel display 540 is in the open or closed positions. The panel display 540 is generally located in the typical lid location for "clamshell" types of portable computers such as laptop or notebook computers. The panel display 540 forms an integral part of the lid of the computer and is set in either an open position with the screen accessible for usage or a closed condition for storage and porting.

The portable computer system 500 also includes a power management chip set 538 which includes power management chip models PT86C521 and PT86C22 manufactured by Pico Power. The power management chip set 538 is connected to microprocessor 505 via local bus 520 so that the power management chip set 538 receives power control commands from microprocessor 505. The power management chip set 538 is connected to a plurality of individual power planes supplying power to respective devices in the portable computer system 500 such as the hard drive 580 and floppy diskette drive 585, for example. The power management chip set 538 operates under control of the microprocessor 505 to control the power to the various power planes and devices of the computer. A real time clock ("RTC") 540 is connected to the I/O controller 575 and the power management chip set 538 so that time events or alarms are transmitted to the power management chip set 538. The real time clock 540 is typically programmed to generate an alarm signal at a predetermined time.

When the portable computer system 500 is turned on or powered up, the system BIOS software stored in non-volatile BIOS memory 524 is copied into main memory 525 to execute instructions more quickly in a technique called "shadowing" or "shadow RAM". At this time, an SMM program code 550 is also copied into the system management mode memory area 526 of main memory 525. The microprocessor 505 executes SMM code 550 after the microprocessor 505 receives a system management interrupt ("SMI") which causes the microprocessor to enter system management mode (SMM) operation. In addition to the SMM code 550, a video BIOS 562 and a system BIOS program code 555 including a power-on self-test (POST) module are stored in the BIOS memory 524 and copied into main memory 525 at power-up. Alternative memory mapping schemes may also be used. For example, SMM code 550 may be stored in fast SRAM memory (not shown) connected to the local/CPU bus 520.

Figure 6:
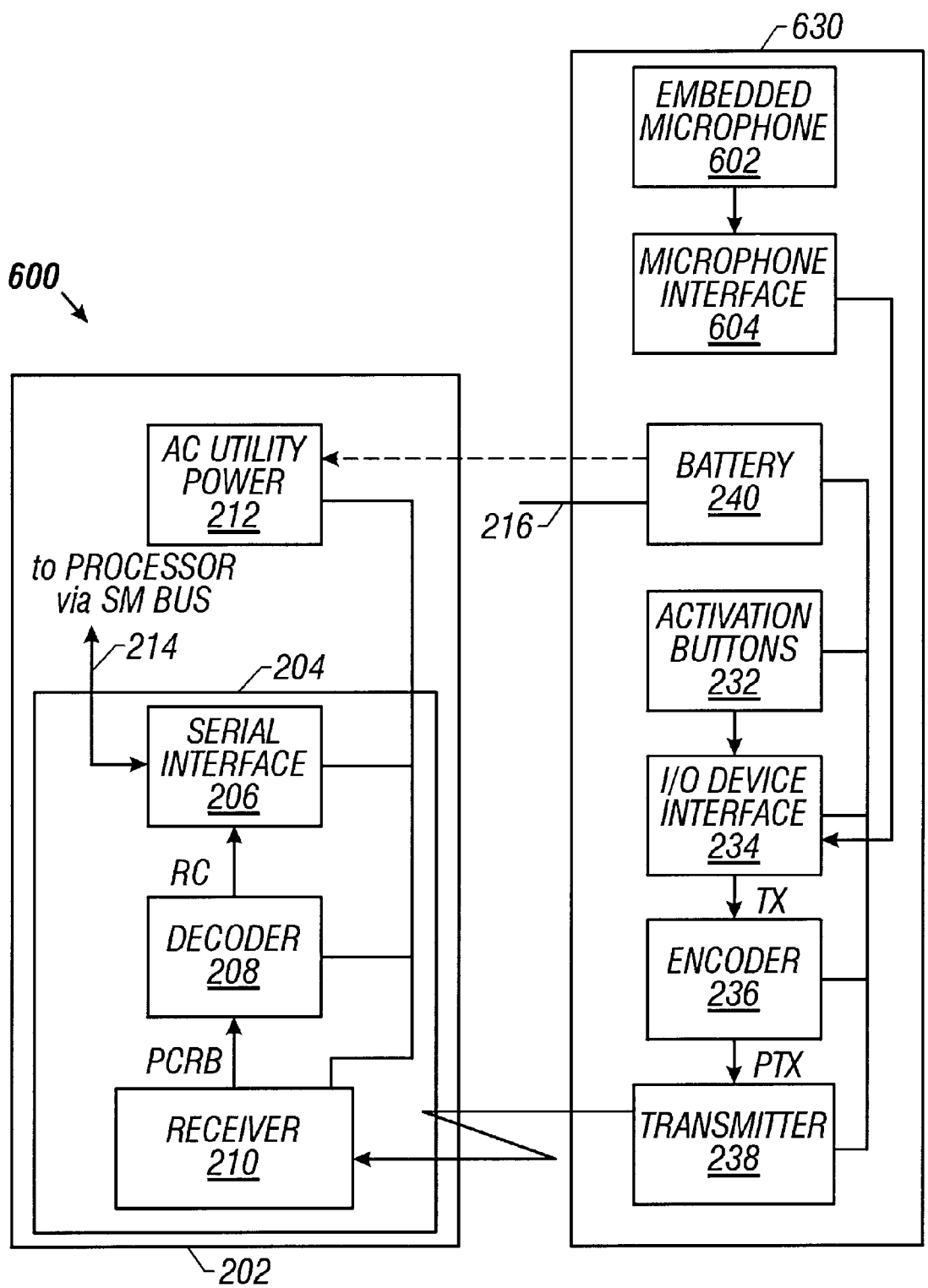
FIG. 6 is a schematic block diagram illustrating an embodiment of a remote I/O device communication system which includes an embedded microphone in a detachable I/O device to add a wireless microphone functionality.

Referring to FIG. 6, a remote I/O device communication system 600 includes an additional enhancement, in particular an embedded microphone 602 is added to the detachable input/output device 230. The embedded microphone 602 is connected to a microphone interface 604 which converts signals from the embedded microphone 602 to a digital format for usage by the I/O device interface 234. The I/O device interface 234 multiplexes the signals from the embedded microphone 602 with signals from the activation buttons 232. The multiplexed signals from the embedded microphone 602 are communicated to the computer 202 via the transmitter 238 and the receiver 210. The signals from the embedded microphone 602 are advantageously performed in multimedia systems using an audio generator (not shown) and speakers (not shown). The embedded microphone 602 advantageously adds a wireless microphone functionality in combination with the remote control features for enhancing the performance of audio/visual programs.

While the invention has been described with reference to various embodiments, it will be understood that these embodiments are illustrative and that the scope of the invention is not limited to them. Many variations, modifications, additions and improvements of the embodiments described are possible. For example, although the disclosed system is based on a portable computer, other types of computers such as desktops, computer-aided design (CAD) systems, computer-aided manufacturing (CAM) systems, workstations, and the like may also be used. In some embodiments these systems include a battery and AC line adapter.

What is claimed is:

1. A computer system comprising:
   a computer housing enclosing a processor;
   a docking station;
   a detachable input/output (I/O) device that detachably docks to the docking station and functions (1) as a connected computer interface when docked to the docking station and (2) as a remote control for wirelessly communicating commands to the processor and controlling operations of the processor when detached from the docking station;
   the docking station for the detachable I/O device adapted to receive wireless communication of commands from the detachable I/O device and transfer the received commands to the processor;
   wherein the detachable I/O device includes a rechargeable battery, and is a detachable trackpad, trackball, or mouse I/O device;
   wherein the computer system includes a charger for recharging the battery when the detachable I/O device is docked to the docking station;
   wherein the detachable I/O device includes:
     a microphone for generating audio signals; and
     a multiplexer for multiplexing the audio signals with the commands, the detachable I/O device communicating the multiplexed audio signals and commands to the docking station; and
   the docking station includes a demultiplexer for demultiplexing the audio signals from the commands for performance of the audio signals.

2. A computer system according to claim 1 wherein:
   the detachable I/O device is a detachable trackpad or trackball I/O device including a plurality of activation buttons for generating commands for communication to the docking station and for controlling the processor.

3. A computer system according to claim 1 further comprising:
   a serial interface coupling the detachable I/O device to the processor, the serial interface including:
     direct serial connections coupling the detachable I/O device to the processor when the detachable I/O device is docked to the docking station; and
     a wireless interface for communicating between the processor and the detachable I/O device when the detachable I/O device is detached from the computer housing.

4. A computer system according to claim 1 wherein:
   the detachable I/O device and the docking station communicate by a radio frequency (RF) wireless communication technology.

5. A computer system according to claim 1 wherein:
   the detachable I/O device and the docking station communicate by a infrared (IR) wireless communication technology.

6. A computer system according to claim 1 wherein:
   the detachable I/O device includes:
     a detachable enclosure;
     a plurality of activation buttons enclosed within the enclosure;
     an I/O interface coupled to the activation buttons and enclosed within the enclosure, the I/O interface for generating command signals based on actuation of the activation buttons;
     an encoder coupled to the I/O interface for encoding the command signals; and
     a transmitter coupled to the encoder and enclosed within the enclosure for transmitting the command signals; and
   the docking station includes:
     a receiver for receiving the transmitted command signals;
     a decoder for decoding the command signals; and
     a serial interface coupled to the decoder and coupled to the processor for transferring the commands from the decoder to the processor.

7. A computer system according to claim 1 further comprising:
   a serial interface coupling the detachable I/O device to the processor, the serial interface including:
     direct serial connections coupling the detachable I/O device to the processor when the detachable I/O device is docked to the docking station; and
     a wireless interface for communicating between the processor and the detachable I/O device when the detachable I/O device is detached from the computer housing, the wireless interface having sufficient transmission and reception power to communicate a remote distance.

8. A computer system according to claim 1 wherein:
   the detachable I/O device includes:
     a detachable enclosure;
     a plurality of activation buttons enclosed within the enclosure;
     an I/O interface coupled to the activation buttons and enclosed within the enclosure, the I/O interface for generating command signals based on actuation of the activation buttons;

an encoder coupled to the I/O interface for encoding the command signals; and a transmitter coupled to the encoder and enclosed within the enclosure for transmitting the command signals, the transmitter having sufficient power to transmit a remote distance; and the docking station includes:
a receiver for receiving the transmitted command signals, the receiver having sufficient power to receive signals over a remote distance;
a decoder for decoding the command signals; and
a serial interface coupled to the decoder and coupled to the processor for transferring the commands from the decoder to the processor.

9. The computer system of claim 1, where the I/O device is a trackpad.

10. The computer system of claim 1, where the I/O device is a trackball.

11. The computer system of claim 1 further comprising:
a main circuit board;
wherein the detachable I/O device includes a first board-to-board connector;
wherein the docking station includes a second board-to-board connector fixably coupled to the main circuit board of the computer system;
wherein the detachable I/O device interconnects to the main circuit board of the computer system via the mating of the first board-to-board connector and the second board-to-board connector when the detachable I/O device is docked to the docking station.

12. An input interface for a computer system comprising:
a detachable input/output (I/O) device that functions as a conventional computer interface when docked to a computer and functions as a remote control for wirelessly communicating commands to the computer and controlling operations of the computer when detached from the computer; and
a docking station for the detachable I/O device for receiving wireless communication of commands from the detachable I/O device and transferring the received commands to the computer;
wherein the detachable I/O device includes a rechargeable battery, and is a detachable trackpad, trackball, or mouse I/O device; and
wherein the docking station includes a charger for recharging the battery when the detachable I/O device is docked to the docking station;
wherein the detachable I/O device includes:
a microphone for generating audio signals; and
a multiplexer for multiplexing the audio signals with the commands, the detachable I/O device communicating the multiplexed audio signals and commands to the docking station, and
the docking station includes a demultiplexer for demultiplexing the audio signals from the commands for performance of the audio signals.

13. A input interface according to claim 12 wherein:
the docking station includes:
a sensor for detecting when the detachable I/O device is docked to the computer; and
a controller for controlling the charger for recharging the battery when the detachable I/O device is connected to the computer.

14. A input interface according to claim 12 wherein:
the detachable I/O device includes:

a detachable enclosure;
a plurality of activation buttons enclosed within the enclosure;
an I/O interface coupled to the activation buttons and enclosed within the enclosure, the I/O interface for generating command signals based on actuation of the activation buttons;
an encoder coupled to the I/O interface for encoding the command signals;
a transmitter coupled to the encoder and enclosed within the enclosure for transmitting the command signals; and
a rechargeable battery cell for powering the activation buttons, I/O interface, encoder and transmitter; and the docking station includes:
a receiver for receiving the transmitted command signals;
a decoder for decoding the command signals;
a serial interface coupled to the decoder and coupled to the computer for transferring the commands from the decoder to the computer; and
a charger for charging the battery of the detachable I/O device when the detachable I/O device is connected to the computer.

15. A input interface according to claim 12 wherein:
the detachable I/O device is a detachable trackpad or trackball I/O device including a plurality of activation buttons for generating commands for communication to the docking station and for controlling the computer.

16. A computer system comprising:
a computer including a processor;
a keyboard housing providing a keyboard and a docking station;
a detachable input/output (I/O) device that detachably docks to the docking station of the keyboard housing and functions (1) as a conventional computer interface when docked to the docking station and (2) as a remote control for wirelessly communicating commands to the computer and controlling operations of the computer when detached from the docking station, the detachable I/O device including a rechargeable battery for powering the detachable I/O device;
the docking station coupled to the processor and detachably coupled to the detachable I/O device adapted to receive wireless communication of commands from the detachable I/O device and transfer the received commands to the computer, the docking station including a charger for recharging the battery in the detachable I/O device when the detachable I/O device is docked to the docking station;
wherein the detachable I/O device includes:
a microphone for generating audio signals; and
a multiplexer for multiplexing the audio signals with the commands, the detachable I/O device communicating the multiplexed audio signals and commands to the docking station; and
wherein the docking station includes a demultiplexer for demultiplexing the audio signals from the commands for performance of the audio signals.

17. A computer system according to claim 16 wherein:
the detachable I/O device and the docking station communicate by a infrared (IR) wireless communication technology.

18. A computer system according to claim 16 wherein:
the docking station includes:

a sensor for detecting when the detachable I/O device is docked to the computer; and a controller for controlling the charger for recharging the battery when the detachable I/O device is connected to the computer.

19. The computer system of claim 16 further comprising:
a main circuit board;
wherein the detachable I/O device includes a first board-to-board connector;
wherein the docking station includes a second board-to-board connector fixably coupled to the main circuit board of the computer system;
wherein the detachable I/O device interconnects to the main circuit board of the computer system via the mating of the first board-to-board connector and the second board-to-board connector when the detachable I/O device is docked to the docking station.

20. A computer system according to claim 16 wherein:
the detachable I/O device includes:
a detachable enclosure;
a plurality of activation buttons enclosed within the enclosure;
an I/O interface coupled to the activation buttons and enclosed within the enclosure, the I/O interface for generating command signals based on actuation of the activation buttons;
an encoder coupled to the I/O interface for encoding the command signals;
a transmitter coupled to the encoder and enclosed within the enclosure for transmitting the command signals; and
a rechargeable battery cell for powering the activation buttons, I/O interface, encoder and transmitter; and
the docking station includes:
a receiver for receiving the transmitted command signals;
a decoder for decoding the command signals;
a serial interface coupled to the decoder and coupled to the computer for transferring the commands from the decoder to the computer; and a charger for charging the battery of the detachable I/O device when the detachable I/O device is connected to the computer.

21. A computer system according to claim 16 wherein:
the detachable I/O device is a detachable trackpad or trackball I/O device including a plurality of activation buttons for generating commands for communication to the docking station and for controlling the computer.

22. A computer system according to claim 16 further comprising:
a serial interface coupling the detachable I/O device to the processor, the serial interface including:
direct serial connections coupling the detachable I/O device to the processor when the detachable I/O device is docked to the docking station; and
a wireless interface for communicating between the processor and the detachable I/O device when the detachable I/O device is detached from the computer housing.

23. The computer system of claim 16 wherein the computer system is a portable computer system and the keyboard housing houses the processor.

24. A computer system according to claim 16 wherein:
the detachable I/O device and the docking station communicate by a radio frequency (RF) wireless communication technology.

25. An audio/visual presentation device comprising:

a computer including a processor;
a docking station coupled to the computer;
a detachable input/output (I/O) device that detachably docks to the docking station and functions (1) as a conventional computer interface when docked to the computer and (2) as a remote control for wirelessly communicating commands to the computer and controlling operations of the computer when detached from the computer; and
the docking station coupled to the processor and detachably coupled to the detachable I/O device adapted to receive wireless communication of commands from the detachable I/O device and transfer the received commands to the computer;
wherein the detachable I/O device includes:
a microphone for generating audio signals;
a rechargeable battery for providing power to the detachable I/O device including the microphone; and
a multiplexer for multiplexing the audio signals with the commands, the detachable I/O device communicating the multiplexed audio signals and commands to the docking station;
wherein the docking station includes a demultiplexer for demultiplexing the audio signals from the commands for performance of the audio signals.

26. An audio/visual presentation device according to claim 25 wherein:
the docking station includes a charger for recharging the battery in the detachable I/O device when the detachable I/O device is docked to the computer.

27. An audio/visual presentation device according to claim 26 wherein:
the detachable I/O device includes:
a detachable enclosure;
a plurality of activation buttons enclosed within the enclosure;
an I/O interface coupled to the activation buttons and enclosed within the enclosure, the I/O interface for generating command signals based on actuation of the activation buttons;
an encoder coupled to the I/O interface for encoding the command signals;
a transmitter coupled to the encoder and enclosed within the enclosure for transmitting the command signals; and
a rechargeable battery cell for powering the activation buttons, I/O interface, encoder and transmitter; and
the docking station includes:
a receiver for receiving the transmitted command signals;
a decoder for decoding the command signals;
a serial interface coupled to the decoder and coupled to the computer for transferring the commands from the decoder to the computer; and a charger for charging the battery of the detachable I/O device when the detachable I/O device is connected to the computer.

28. An audio/visual presentation device according to claim 26 wherein:
the docking station includes:
a sensor for detecting when the detachable I/O device is docked to the computer; and
a controller for controlling the charger for recharging the battery when the detachable I/O device is connected to the computer.

29. An audio/visual presentation device according to claim 25 wherein:

the detachable I/O device and the docking station communicate by a radio frequency (RF) wireless communication technology.

30. An audio/visual presentation device according to claim 25 wherein:

the detachable I/O device and the docking station communicate by a infrared (IR) wireless communication technology.

31. An audio/visual presentation device according to claim 25 further comprising:

a serial interface coupling the detachable I/O device to the processor, the serial interface including:

direct serial connections coupling the detachable I/O device to the processor when the detachable I/O device is docked to the docking station; and a wireless interface for communicating between the processor and the detachable I/O device when the detachable I/O device is detached from the computer housing.

32. An audio/visual presentation device according to claim 30 wherein the microphone is an embedded microphone.

33. An audio/visual presentation device according to claim 25 wherein:

the detachable I/O device is a detachable trackpad or trackball I/O device including a plurality of activation buttons for generating commands for communication to the docking station and for controlling the computer.

* * * * *